Patented June 15, 1937

2,084,082

UNITED STATES PATENT OFFICE 2,084,082

METHOD OF POLYMERIZING OLEFIN HYDROCARBONS

Louis H. Fitch, Jr., Bartlesville, Okla.; The First National Bank in Bartlesville, a national banking corporation, administrator of said Louis H. Fitch, Jr., deceased, assignor to Phillips Petroleum Company, a corporation of Delaware No Drawing. Application January 26, 1934, Serial No. 708,519

13 Claims. (Cl. 260—170)

This invention relates to the polymerization of olefin hydrocarbons and similar unsaturated compounds, and has as its object the selective polymerization of the tertiary or gamma olefins, in the presence of other olefins, in an advantageous manner.

A further object is the polymerization of all the olefins in a given hydrocarbon mixture with the production primarily of polymers of low molecular weight, all as more fully hereinafter set forth and claimed.

The polymerization of olefin hydrocarbons is desirable for many purposes. Gaseous olefins may be polymerized to liquids suitable for motor fuel, or gaseous and liquid olefins may be polymerized to bodies of higher molecular weight, such as lubricating oils and resinous products.

Many processes and reagents for polymerizing olefin hydrocarbons have been described in the literature. It is also well known that the tertiary or gamma olefins are the most readily polymerized, and many processes for their selective polymerization have been described; e. g. Mueller-Cunradi, U. S. 1,889,952 (1932). The polymerization of olefins by the action of the anhydrous halides of aluminum, iron, zinc and boron, under suitable conditions, is also of common knowledge, but the action of solutions of these halides has received less study. Water solutions of zinc chloride, as used for treating gasoline at high temperatures, have apparently very little polymerizing action, and simple, crystallizable olefin-halide complexes have been obtained by passing olefins into alcohol solutions of ferric and aluminum chlorides (Gangloff and Henderson, J. A. C. S. 39, 1420, 1917.)

I have found that under certain circumstances, alcohol solutions of these anhydrous halides may be used to polymerize olefin hydrocarbons. Particularly suitable for this purpose are alcohol solutions of the chlorides of ferric iron, zinc, or aluminum, and, of these, the most powerful polymerizing reagent, in such solution, is ferric chloride.

In carrying out my process, the concentration of the reagent in the solution is naturally of importance. solutions of ferric chloride in ethanol, of 1.6 specific gravity, attacking all the butylenes and amylenes rapidly at room temperature with the evolution of considerable heat, whereas solutions of 1.25 specific gravity consisting of about fifty percent ferric chloride by weight, will rapidly polymerize only those hydrocarbons containing a tertiary carbon atom. In this illustration, I refer to the anhydrous reagents, as the large quantities of water which would be present in the solution if the hexahydrate of ferric chloride were used, will make the process inoperative. However, small quantities of water, up to ten percent of the alcohol used, may be permitted. The alcohol used may be any one of the lower alcohols, such as methyl, ethyl or isopropyl alcohol.

I have found that anhydrous alcohol solutions of zinc halides are less active than ferric chloride, very strong solutions attacking only the tertiary olefins at an appreciable rate at 100° C., and anhydrous aluminum chloride solutions in alcohol are also less reactive than ferric chloride, possibly due to some reaction between the aluminum chloride and the alcohol in forming the solution. However, they may be used as polymerizing agents where, for example, it is desired to polymerize isobutylene in the presence of the other butenes.

These alcohol solutions of ferric, zinc and aluminum halides are true solutions, and should not, of course, be confused with suspensions of these halides in inert organic liquids which merely act as a diluent for the olefins to be polymerized.

In the preferred modification of my process, I polymerize olefins of from three to eight carbon atoms per molecule, by contacting them in the liquid phase, under pressure if necessary, with solutions of anhydrous ferric chloride in one of the lower alcohols, so controlling the concentration, time, temperature, and relative quantity of polymerizing agent as to obtain the desired polymerization with a minimum formation of high polymers and tarry materials. All of the olefins in a given mixture may be polymerized in one stage, or those containing a

linkage may be polymerized in one stage, and the others then either polymerized in a second stage, or used for other purposes, such as the formation of secondary alcohols, or of olefin-sulfur dioxide resinous bodies. I consider it part of my invention that I have discovered such solutions of a concentration of 30% to 60% by weight of ferric chloride to be extremely selective reagents for the polymerization of tertiary olefins in the presence of other olefins. Such solutions will have specific gravities approximately within the range 1.0 to 1.4. For example, a fraction of oil refinery vapors containing 13% isobutylene, 22%

1- and 2-butenes, and 65% butanes was treated for one hour at 70° C. in a bomb with an equal weight of 1.27 specific gravity solution of ferric chloride in methanol, and practically all the isobutylene polymerized. Subsequent treatment for six or seven hours under identical conditions did not diminish appreciably the content of 1- and 2-butenes present.

In the above examples, ferric bromide may be substituted for the chloride, but without any advantages to offset its higher cost.

The polymers so formed are principally light, fairly volatile oils of low viscosity and a very pronounced odor. They are not usually good lubricants, but they may be used as solvents or high antiknock motor fuel. To some extent, they may tend to remain dissolved in the ferric chloride solutions, from which they may be separated by vacuum distillation, or the addition of water. When discolored by tarry materials or ferric chloride or its complexes, they may be purified by distillation. By fractionation, they may sometimes be made to yield individual hydrocarbons, as, for example, diisobutylenes, from the products of the selective polymerization of isobutylene.

While these solutions may be used to polymerize almost any material containing an ethylene linkage, I especially contemplate the polymerization of olefinic hydrocarbons containing from three to eight carbon atoms, and generally prefer to use them for the selective polymerization of tertiary olefins in admixture with other olefin and paraffin hydrocarbons of approximately the same number of carbon atoms, subsequently separating the polymer from unchanged paraffins and olefins, which I may then react with sulfur dioxide to produce resinous bodies, or use otherwise, as for the production of secondary alcohols by known methods.

While it is evident that these ferric chloride solutions will polymerize certain diolefins, I do not contemplate the polymerization of such materials to synthetic rubbers or rubber-like or resinous material, nor do I intend the production of viscous polymers suitable for use as lubricants.

Various means of accomplishing the things contemplated in this invention will be immediately apparent to those skilled in the art. For example, contact of olefins with the ferric chloride or other solutions may be effected by a batch or continuous countercurrent procedure, or by repeated contacting with separation of unchanged material from the polymers by distillation between each contacting period.

This application is a continuation in part of applicant's application Serial No. 628,449, filed August 11, 1932.

What I claim and desire to secure by Letters Patent is:

1. The method of selectively polymerizing tertiary olefins, which comprises contacting said olefins with solutions of anhydrous ferric chloride in an alcohol of the group: methyl, ethyl or isopropyl, said solutions having a specific gravity within the range of 1.0 to 1.4.

2. The method of selectively polymerizing tertiary olefins, in a mixture thereof with other olefins, which comprises subjecting said mixture to intimate contact with a solution of anhydrous ferric chloride in an alcohol of less than four carbon atoms per molecule, said solution containing from 30 to 60 percent by weight of the halide.

3. The method of selectively polymerizing tertiary olefins containing from four to eight carbon atoms per molecule, which comprises subjecting a mixture containing said olefins together with other olefins of approximately the same number of carbon atoms per molecule, to the action of a solution of anhydrous ferric chloride in an alcohol of the group: methyl, ethyl and isopropyl, said solution having a specific gravity within the range 1.0 to 1.4.

4. The method of selectively polymerizing isobutylene in the presence of other butylenes, which comprises contacting hydrocarbon mixtures containing substantial proportions of the said butylenes with a solution of anhydrous ferric chloride in an alcohol of the group: methyl, ethyl and isopropyl, said solution containing from 30 to 60 percent by weight of the chloride.

5. The method of selectively polymerizing trimethylethylene and unsymmetrical methyl ethyl ethylene in mixtures of these olefins with the other pentenes and pentanes, which comprises subjecting such mixtures to intimate contact with a solution of anhydrous ferric chloride in an alcohol of the group: methyl, ethyl and isopropyl, said solution containing from 30 to 60 percent by weight of the chloride.

6. The method of selectively polymerizing tertiary olefins of less than eight carbon atoms in a mixture thereof with other olefin and paraffin hydrocarbons of approximately the same number of carbon atoms, which consists in contacting the said olefin-containing mixtures with a substantial relative proportion of a solution of a substantially anhydrous halide of the chloride-bromide type, selected from the halides of the metals of the group zinc, aluminum, and ferric iron, the said solution being formed from a saturated aliphatic alcohol of less than four carbon atoms and such a proportion of the aforesaid halide as to yield a solution with a specific gravity in the range 1.0 to 1.4.

7. The method of preparing hydrocarbon mixtures free from tertiary olefins, which comprises subjecting a mixture containing said tertiary olefins, together with other paraffin and olefin hydrocarbons of substantially the same number of carbon atoms, to the action of a substantial proportion of a solution of ferric chloride, the said solution being formed from an alcohol of not more than three carbon atoms together with such a proportion of substantially anhydrous ferric chloride as will raise the specific gravity of the said solution to within the range of approximately 1.0 to 1.4, and separating the unchange hydrocarbons from the said solution and polymers by distillation.

8. The process of removing isobutylene from a mixture of saturated and unsaturated hydrocarbons such as the four-carbon-atom fraction of cracking still vapors, which comprises treating said mixture in the liquid phase with a solution of anhydrous ferric chloride in methanol having a specific gravity of approximately 1.27, whereby the isobutylene is substantially completely polymerized while practically none of the butenes −1 and −2 in the said mixture are converted, and separating the unconverted hydrocarbons from the polymerisate by fractional distillation.

9. The process of selectively polymerizing isobutylene in mixtures containing isomeric butylenes which comprises treating the said mixtures in the liquid phase with a solution of substantially anhydrous ferric chloride in methanol, the said solution having a specific gravity of approximately 1.27, whereby the isobutylene is substantially completely polymerized while practically none of the butenes −1 and −2 are converted.

10. The process of selectively polymerizing trimethylethylene and unsymmetrical methyl-ethylethylene in mixtures containing isomeric pentenes which comprises treating the said mixtures in the liquid phase with a solution of substantially anhydrous ferric chloride in methanol, the said solution having a specific gravity of approximately 1.27, whereby the said trimethylethylene and unsymmetrical methylethylethylene are substantially completely polymerized while practically none of the pentenes −1 and −2 are converted.

11. The method of selectively polymerizing tertiary olefins of less than 8 carbon atoms in a mixture thereof with other olefin and paraffin hydrocarbons of approximately the same number of carbon atoms, which consists in contacting the said olefin-containing mixtures with a substantially relative proportion of a solution of substantially anhydrous zinc halide of the chloride-bromide type, the said solution being formed from a saturated aliphatic alcohol of less than 4 carbon atoms and such a proportion of the aforesaid zinc halide as to yield a solution with a specific gravity in the range of 1.0 to 1.4.

12. The method of selectively polymerizing tertiary olefins of less than 8 carbon atoms in a mixture thereof with other olefin and paraffin hydrocarbons of approximately the same number of carbon atoms, which consists in contacting the said olefin-containing mixtures with a substantially relative proportion of a solution of substantially anhydrous zinc bromide, the said solution being formed from a saturated aliphatic alcohol of less than 4 carbon atoms and such a proportion of the aforesaid zinc bromide as to yield a solution with a specific gravity in the range of 1.0 to 1.4.

13. The method of selectively polymerizing tertiary olefins of less than 8 carbon atoms in a mixture thereof with other olefin and paraffin hydrocarbons of approximately the same number of carbon atoms, which consists in contacting the said olefin-containing mixtures with a substantially relative proportion of a solution of substantially anhydrous ferric bromide, the said solution being formed from a saturated aliphatic alcohol of less than 4 carbon atoms and such a proportion of the aforesaid ferric bromide as to yield a solution with a specific gravity in the range of 1.0 to 1.4.

LOUIS H. FITCH, Jr.